United States Patent Office 3,536,503
Patented Oct. 27, 1970

3,536,503
BLOATED CLAY AND METHOD OF
PREPARATION
Walter Heidrich, Urach, Wurttemberg, Germany, assignor to Synfibrit G.m.b.H., Glarus, Switzerland
No Drawing. Filed Mar. 16, 1967, Ser. No. 623,535
Claims priority, application Germany, Mar. 17, 1966,
S 102,598
Int. Cl. C04b 21/02
U.S. Cl. 106—41  5 Claims

ABSTRACT OF THE DISCLOSURE

Plastic clay is treated with an aqeous solution of an alkali-free binder, a suspension of a fluxing agent, and an emulsion of a gas evolving adjuvant to produce, on firing, bloated clay particles which have a closed-cell core surrounded by a thin water-absorptive shell.

---

This invention relates to bloated clay and to a process for its preparation.

In the preparation of bloated clay, it is known to use auxiliary additives. For instance, attempts have been made to provide a bloated clay core with a vitrified shell in order to prevent the undesired water absorbing properties. When water absorbing bloated clay is used as additive to concrete, it becomes difficult to control the required water-cement value which is one of the factors determining the mechanical properties of the concrete; in addition, the moisture content of the clay particles reduces strongly the heat insulation.

A dense coat produced on the bloated clay core by applying powdered vitrifying substances presents serious drawbacks. If the powdered substance is applied prior to bloating, the bloating clay grains on their passage through the kiln tend to stick together or to form incrustations. If powder is applied to the grains after foaming, they require an after-treatment and present a too smooth surface which has an unfavorable effect in the concrete.

It is also known to use additives for improving the bloating properties of clays. Auxiilary substances such as sulfite waste liquor, heavy oils rich in carbon, powdered coal, sulfates, carbonates, and the like were kneaded into plastic clay or otherwise admixed in order to reduce the apparent density (specific weight of porous bodies) of the bloated clay.

Generally, clay types used for the manufacture of bloated clay contain already naturally substances which are capable of evolving gas. The addition of the recited auxiliary agents which mostly have been selected on the basis of empirical tests, is intended to increase the proportion of such gas developing substances and thus to improve the bloating effect.

However, the known procedures did not make it possible to produce a bloated clay which combined low bulk density with the desired low water absorption. Clays containing a large amount of bloating components gave mostly products having a high proportion of large open pores. When vitrifying or glazing substances were added to the slip, the difficulties recited above occurred in the kiln treatment. When said substances were dusted on after the vesiculation, the glaze caused a considerable weight increase of the granules. Thus, there are no satisfactory solution of the problem of finding additives for a light weight concrete of high and constant heat insulation.

It is, therefore, a principal object of the invention to provide a combination of additives which allows of converting almost any plastic clay to a bloating clay of desired low bulk density and low water absorbency.

Other objects and advantages will become apparent from a consideration of the specification and claims.

The starting material for the method of the invention is a plastic clay which in the natural state may or may not may not contain gasifiable components.

First, the natural raw product is homogenized in the dry state. In the following preparation of the slip from the dry clay powder, a combination of the additives is added to the liquid forming the slip. Said combination consists of (1) a preferably aqueous solution free of alkali which contains a binder setting at temperatures below 300° C.;
(2) a powdery fluxing agent suspended in the liquid, and preferably also
(3) emulsified or suspended blowing agents.

The granulate material which will be called hereafter "raw granulate" to distinguish it from the finished bloated material, is dried at a temperature below 300° C. in stationary condition. Subsequently, it is bloated at temperatures between 1000 and 1200° C. in a reducing atmosphere and after cooling may be classified according to grain sizes, in preparation for the manufacture of light weight concrete wtih cement, or for the manufacture of shaped articles and gypsum, resins or other binders.

Some components of the combination of additives used according to the invention have already been used in the production of bloated clay. For instance, sulfite waste liquor, a waste product of the cellulose industry, meets the requirement of a solution according to the invention. Sulfite waste liquor is an aqueous solution of the calcium salt of lignin sulfonic acid, acetic acid, tannic acid, silicic acid, sugar, and nitrogen compounds. It is free of alkali and contains binders which set below 300° C.

Also fluxing agents, especially alkaline solutions, have been already added to clay to produce a molten phase in the bloating process so as to prevent escape of the bloating gases.

However, the combined application of said two groups must be considered senseless because they exert opposite modes of action.

Bloatable clays to which sulfite waste liquor has been added, show generally little tendency to the dreaded grape formation of bloated granulate in the kiln. As sticking together is assisted by a fluxing agent, it had to be assumed that the simultaneous addition of such fluxing agents, like solid or dissolved alkalies, would counteract said advantageous effect of the sulfite liquor. It is surprising that the contrary is true.

It is essential for the favorable effects of the process of the invention that the vitrifying agents are added in form of a suspension. Also the form of the suspension or emulsion for the addition of the blowing additives is important.

I have found that in drying the raw granulate (heating to the water evaporating temperature), true solutions act differently from suspensions and emulsions. In the drying of the raw granulate, true solutions can be shown to have the tendency of diffusing as entities out of the granules; therefore, the precipitation of the dissolved substance from the solvent takes place essentially at the transfer of the moisture from the granule to the drying gas The dissolved substances concentrate and accumulate at the surface of the granules. In contrast thereto, suspended or emulsified substances have in the drying process obviously the tendency of separating from the suspending or emulsifying liquid in situ.

This discovery presents the possibility, by selectively using dissolved or suspended (emulsified) substances, to distribute said substances inside the core of the raw granules or to concentrate them at the surface.

In accordance with the invention, there is added, a solution of additives which during the drying process are capable of forming a solidified shell around the granule. Said additives act as binders and are set or cured at low temperatures below 300° C., preferably just above 100° C. At the higher temperatures of the subsequent bloating process, which are, depending on the raw material, in the range of 1000–1200° C., the previously dissolved substances do not form a melt; due to the lack of alkaline vitrifying components, their layer, which may be carbonized, exerts a separation effect.

A suitable solution is, for instance, sulfite waste liquor which has the advantage of being economic and available in large amounts. Other examples are phenolic resin and dextrin solutions.

In contrast to the binder, the powdered fluxing agents and gasfiable bloating adjuvants are added in suspension or emulsion. On drying, the suspended or emulsified substances separate from the carrier liquid in situ and remain in fine distribution between the clay particles inside the cores of the raw granulate material, while the liquid diffuses out and evaporates. In the subsequent bloating operation, said finely dispersed fluxing substances form a molten phase throughout the core of the granules. In this way, the naturally present or added gasifiable substances are encapsulated, whereby the latter are introduced also as suspension or emulsion. The molten phase forms at temperatures which are considerably below the bloating temperature obtaining in the kiln. The encapsulated bloating gases expand and form cells. Thereby, the raw granular aggregate increases by five to ten times its volume, and the apparent density of the granules decreases accordingly.

The preferred fluxing agent is iron-III-oxide or phonolite. Other suitable fluxing agents are, e.g. basaltic lava, pumice, glass waste or glaze frit, all in finely pulverized state.

The drying operation is adjusted to the combination of additives. The drying temperatures must not exceed 300° C. and are preferably just above 100° C., because of the organic additions. Essentially only the solvent or suspension water shall be vaporized; the gasifiable substances in the core of the granules should be retained as far as possible until the molten phase is formed, and also the binder in the shell must not be destroyed by the temperature but only cured.

The material is dried preferably as a layer in which the particles are not in motion with respect to each other. It has been found that this provides for a particularly favorable deposition of the binder. Heretofore, this kind of drying was only seldom applied. It has the additional advantage of preventing the formation of dust by abrasion. Tests have shown that dust produced when drying moving material, e.g. in a rotary drier, contributed to, and increased, the risk of agglomeration and deposits in the kilns in the later foaming step.

The bloating operation subsequent to the drying process takes place at temperatures around 1100° C. The raw granulated material, which is being dried and solidified while at rest on a belt or grate, is passed into a kiln or on a sinter grate, preferably in a reducing oven atmosphere.

As a result of the sequence of the preceding steps according to the invention, the temperature increase from about 200° C. to about 1100° C. starts a number of complicated reactions which eventually form the improved bloating clay. In a simplified form, said reactions may be described as follows:

The organic compounds, contained in the clay naturally or as additions, are cracked and gasified; at the same time, a molten phase is formed throughout each granule and encloses the developing gases. Assisted by the reducing atmosphere, the organic components of the reenforcing layer are carbonized and remain in mixture with the inorganic residues and the clay. As the surface of the granules is poorer in the molten phase, it does not induce the granules to stick together or to form fire rings in the bloating oven. The evolved gases are effectively locked in the interior of the granules. The finely distributed molten phase causes the formation of many fine cells which are closed against each other.

Depending on the amount of added blowing agents or bloating adjuvants, which may be natural or synthetic oils, the product of the invention can be obtained in exceptionally small bulk density compared with bloated clay now available in commerce. It is also distinguished by its grain structure. The thin rough shell takes up a small amount of water; however, the core which amounts to considerably more than 90 percent of the grain volume and consists of a great number of closed cells, is impermeable to water and water vapor.

When the bloated clay of the invention is used as light weight addition to cement for the production of light weight concrete, small amounts of water are accumulated in the thin shell. However, in contrast to conventional bloated clay, no moisture enters the core. The water in the shell has a favorable effect because it is available for the cement hydration, i.e. at a propitious time, which is not the case for conventional bloated clay where moisture has diffused into the core. The water impermeable core of the product obtained in accordance with the invention has considerable advantages for the manufacture of concrete as well as concerning the constant heat insulating effect of the bloated granulate material.

A further advantage resides in the very simple procedure. The clay used as starting material has such a fine particle size that further comminution is unnecessary, and only the granulating water containing the additives has to be admixed.

The following examples are given to illustrate but not to limit the invention.

EXAMPLE 1

Plastic brick clay, which naturally contains substantially no gasifiable components, is dried in a hot gas drier combined with a beater mill to about 2% moisture and thereby reduced to a fine powder.

The powdered clay is formed to granules on a granulating disc. The further procedure will be described for the preparation of bloated clay of the grain sizes 7–15 mm.

For 100 parts by weight of clay, there are required about 20 parts of granulating liquid which is composed as follows, all parts given by weight:

1 part sulfite waste liquor (as about 50% aqueous solution
1 part heating oil, emulsified
18 parts water, in which
5 parts phonolite are suspended.

During the granulating process, the mixture is kept in motion by an agitator.

The obtained raw granulate is then gently dried as a stationary layer on a drying belt on which it is heated with a mixture of air and waste gases from the bloating kiln. Thereby, it is preheated and conveyed to the bloating kiln. The latter is a relatively short rotary kiln of large diameter, which is directly heated with oil. By throttling the combustion air, a weakly reducing atmosphere is obtained in the kiln. With counter-flow firing, the temperature increases from the charge inlet of the kiln to the burner from about 1050 to 1150° C. The raw granulate, which has a bulk density of about 1000 kg./m.$^3$ and particle sizes of about 4 to 9 mm., is expanded in the kiln to a bloated granulate of about 250 kg./m.$^3$ bulk density and a particle size of about 7 to 15 mm. This corresponds to an average apparent density of the bloated clay of 0.45 g./cm.$^3$.

The bloated clay is cooled in a drum for utilization of the waste heat and shows e.g. for a 10 mm. large grain a density vitrified multicellular core with a thin rough shell of about 0.1 mm. thickness.

EXAMPLE 2

The starting material is a clay which already naturally contains gasifiable components, and which, with the same processing technique and temperature treatment, but without addition to the granulating water, can be converted to bloated clay at a bulk density of about 500 kg./m.$^3$ in the particle size group 6–12 mm.

To 100 parts by weight of said clay, prepared for granulation as in Example 1, the following granulating liquid is added:

0.5 part dextrin solution
20 parts water, and suspended therein
3 parts iron-III-oxide Granulation, drying of the raw granulate, and bloating are carried out under the same conditions as set forth in Example 1.

There is obtained a bloated granulate having a bulk density of about 300 kg./m.$^3$ in the particle size group 7 to 15 mm. This corresponds to an average apparent density of the bloated clay of 0.6 g./cm.$^3$.

I claim:

1. A method for the preparation of bloated clay which comprises granulating 100 parts by weight powdered clay with an aqueous liquid containing dissolved therein from 0.5 to 1 part by weight alkali-free binder setting at a temperature below 300° C. and suspended therein from 3 to 5 parts by weight powdered fluxing agent, drying and solidfying the obtained granulate at a temperature in the range between just above 100° C. and below 300° C. as a layer whose particles are at rest with respect to each other, and subsequently bloating the dried granulate by heating at a temperature between 1000° and 1200° C.

2. The method as claimed in claim 1 wherein said aqueous liquid contains 1 part blowing agent which develops gas on heating.

3. The method as claimed in claim 2 wherein said blowing adjuvant is an emulsion of a member of the group consisting of synthetic and natural oils.

4. The method as claimed in claim 1 wherein said binder is sulfite waste liquor and said fluxing agent is phonolite.

5. The method as claimed in claim 1 wherein said binder is dextrin and said fluxing agent is iron-III-oxide.

References Cited

UNITED STATES PATENTS

| 2,654,136 | 10/1953 | Harford et al. | 106—41 |
| 2,786,772 | 3/1957 | Stewart et al. | 106—67 |
| 2,955,947 | 10/1960 | Gmeiner et al. | 106—41 |
| 3,378,382 | 4/1968 | Burkett | 106—41 |

FOREIGN PATENTS 532,763  11/1956  Canada.

JAMES E. POER, Primary Examiner

U.S. Cl. X.R.

106—67, 72, 288